United States Patent
Wang et al.

(10) Patent No.: US 6,803,805 B2
(45) Date of Patent: Oct. 12, 2004

(54) DISTRIBUTED DC VOLTAGE GENERATOR FOR SYSTEM ON CHIP

(75) Inventors: Li-Kong Wang, Montvale, NJ (US); Louis L. Hsu, Fishkill, NY (US); Fanchieh Yee, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/118,753

(22) Filed: Apr. 9, 2002

(65) Prior Publication Data

US 2003/0189460 A1 Oct. 9, 2003

(51) Int. Cl.⁷ ................................................ G05F 3/02
(52) U.S. Cl. ........................................ 327/534; 307/11
(58) Field of Search ............................. 327/530, 534, 327/536; 365/226, 229; 307/11

(56) References Cited

U.S. PATENT DOCUMENTS

| | | | |
|---|---|---|---|
| 5,255,224 A | * 10/1993 | Galbi et al. | 365/189.09 |
| 5,337,284 A | 8/1994 | Cordoba et al. | |
| 5,596,532 A | * 1/1997 | Cernea et al. | 365/185.18 |
| 5,621,685 A | * 4/1997 | Cernea et al. | 365/185.18 |
| 5,654,859 A | * 8/1997 | Shi | 361/66 |
| 5,841,703 A | * 11/1998 | Wojciechowski | 365/189.09 |
| 6,005,812 A | * 12/1999 | Mullarkey | 365/189.09 |
| 6,016,072 A | 1/2000 | Ternullo, Jr. et al. | |
| 6,060,873 A | 5/2000 | Ternullo, Jr. et al. | |
| 6,434,044 B1 | * 8/2002 | Gongwer et al. | 365/185.18 |
| 2002/0141238 A1 | * 10/2002 | Pasternak | 365/185.11 |

* cited by examiner

*Primary Examiner*—Terry D. Cunningham
(74) *Attorney, Agent, or Firm*—Louis J. Percello; Dilworth & Barrese LLP

(57) ABSTRACT

A system on a chip (SOC voltage generator) system is provided for supplying at least one voltage level to a plurality of units on a chip having an SOC design. The system includes a plurality of local DC voltage generators distributed throughout the chip, each local DC voltage generator independently supplying voltage to at least one unit of the plurality of units, each local DC voltage generator including a regulator system outputting one pump control signal; and a pump system receiving the one pump control signal and outputting at least one voltage level in accordance with the one pump control signal. Furthermore a method for supplying voltage to a plurality of units on a chip having an SOC design is provided. The method includes the steps of distributing a plurality of local DC voltage generators throughout the chip; and supplying at least one voltage level to the plurality of units via the plurality of local DC voltage generators.

1 Claim, 4 Drawing Sheets

DISTRIBUTED DC VOLTAGE GENERATOR FOR SYSTEM ON CHIP

BACKGROUND OF THE INVENTION

1. Field of the Invention

The present invention relates to integrated circuit design, and more specifically, to a DC voltage generator for a system on chip (SOC).

2. Discussion of the Related Art

When designing and producing digital products, it is an ongoing goal to minimize size, increase capabilities and minimize power consumption. For example, the market calls for smaller and more powerful handheld digital products such as cellular phones, pagers, global positioning systems (GPS's), personal digital assistants (PDAs), laptop computers and palm computers, while minimizing power consumption for extending battery life. To help accomplish this, System on Chip (SOC) design is implemented in which various components, such as volatile memory systems, non-volatile memory systems, data signal processing systems, mixed signal circuits and logic circuits are each formed into units and integrated on a single chip. Digital systems using SOC design, such as those used in handheld digital products, has replaced bulkier and higher power consuming digital systems built on a board in a package having several chips. As technology advances, integration of various units included in a SOC design becomes increasingly complicated.

The purpose of a DC voltage generator system on a semiconductor chip is to provide power regulation and power conversion, such as for converting a voltage provided by an external power supply, to a proper voltage level for performing an operation being executed by the chip. One particular challenge of integrating the various units is the provision of proper voltage levels to the individual units by an on-chip DC voltage generator system, as the units on the chip have a broad range of functionality as well as voltage and power requirements. For example, an embedded DRAM (eDRAM) unit generally requires a high operating voltage relative to digital logic circuit units, while analog circuits of mixed signal units generally require an even higher operating voltage. Regarding power requirements, memory units generally require less power than digital logic circuit units, while analog circuits of mixed signal units typically require more power than the other units.

A typical DC voltage generator system includes a central DC voltage generator having a plurality of regulator systems, and a pump system (also referred to as charge pump) associated with each regulator system. The DC voltage generator system further includes wiring for providing the voltages provided by the central DC voltage generator to the units of the chip. The DC voltage generator system having a central DC voltage generator is cumbersome, and is susceptible to contributing to power supply noise and noise cross-contamination between neighboring units.

FIG. 1 shows an exemplary conventional regulator system 30 of an on-chip DC voltage generator system, which is described in U.S. Pat. No. 6,060,873, to Ternullo, Jr. et al., which is incorporated herein by reference. The regulator system 30 receives a boosted supply voltage $V_H$, a supply voltage $V_{DD}$, and a power-up control signal PU, and outputs a boost control signal BC, which is propagated to a charge pump (not shown). The regulator system 30 is used to convert the externally supplied power to the voltage and current needed for the chip, while regulating the voltage with stability and noise reduction. The regulator system 30 controls the charge pump for increasing or decreasing the voltage output by the charge pump accordingly. The voltage output by the charge pump is provided to the various units of the chip.

A further disadvantage of the DC voltage generator system having a central DC voltage generator is that in order to provide enough current for full speed operation of the chip, in which one or more units operate in a high performance mode, the DC voltage generator system is usually designed to meet a highest power consumption condition. The charge pumps of the central DC voltage generator are controlled to all provide the same current to the units on the chip, even when one or more of the units on the chip are operating in a low-performance mode, thus wasting power.

Furthermore, the conventional DC voltage generator system having a central DC voltage generator does not generally contribute to power conservation. For example, in SOC design power conservation is implemented by using low power systems on chip (LP-SOC), which typically uses a low-power architecture. When operating in high performance mode, all units on an LP-SOC chip work at full speed. When switching activity is decreased, in which data processing speed and data input/output slows down and some units are disabled, the chip clock slows down in order to save power. However, the central DC voltage generator operates as usual by providing power to the units, regardless of whether the units are disabled or the chip clock output is changed, and power may be consumed without actually executing data.

Accordingly, a need exists for a system and a method for an SOC DC voltage generator system having a network of small sized distributed local voltage generators providing scalable voltage and power levels to different units on the chip. A need further exists for a system and method for an SOC DC voltage generator system that is controlled to operate in accordance with variable performance. Finally, a need exists for clock gated local voltage generators for individually controlling each local voltage generator in accordance with a clock signal indicative of a low performance mode.

SUMMARY

It is an aspect of the present invention to provide a system and a method for an SOC DC voltage generator system having a network of distributed local voltage generators providing scalable voltage levels to different units on the chip.

It is a further aspect of the present invention to provide a system and method for an SOC DC voltage generator system that is controlled for operating in variable performance modes.

Finally, it is an aspect of the present invention to provide a system and method for clock gated local voltage generators for individually controlling each local voltage generator in accordance with a clock signal indicative of a low performance mode.

Accordingly, the present invention provides an SOC voltage generator system for supplying at least one voltage level to a plurality of units on a chip having an SOC design. The voltage generator system includes a plurality of local DC voltage generators distributed throughout the chip, each local DC voltage generator independently supplying voltage to at least one unit of the plurality of unites, each local DC voltage generator including a regulator system outputting one pump control signal; and a pump system receiving the one pump control signal and outputting at least one voltage level in accordance with the one pump control signal.

Furthermore, the present invention provides a method for supplying voltage to a plurality of units on a chip having an SOC design, the method including the steps of distributing a plurality of local DC voltage generators throughout the chip; and supplying at least one voltage level to the plurality of units via the plurality of local DC voltage generators.

BRIEF DESCRIPTION OF THE FIGURES

The above and other features of the present invention will become more apparent from the following detailed description of preferred embodiments, taken in conjunction with the accompanying drawings, in which.

DETAILED DESCRIPTION OF THE INVENTION

The present invention provides a distributed DC voltage generator system having a plurality of distributed local DC voltage generators. Each of the local DC voltage generators converts a voltage provided from an external power supply to an appropriate voltage level for an associated unit of a chip having a system on chip (SOC) design. Furthermore, each local DC voltage is individually controlled in accordance with a power control signal and a clock control signal. Hence, the distributed DC voltage generator system of the present invention provides for provision of a scalable voltage and power level to individual units of the chip, and individual switching on/off of voltage/power provision to individual units for conservation of power. The present invention also provides a preferred method for distributing a scalable voltage and power level to individual units of the chip controlled by operating conditions of the chip to reduce power consumption, while decreasing power supply noise and noise cross-contamination between neighboring units.

Figure 2:
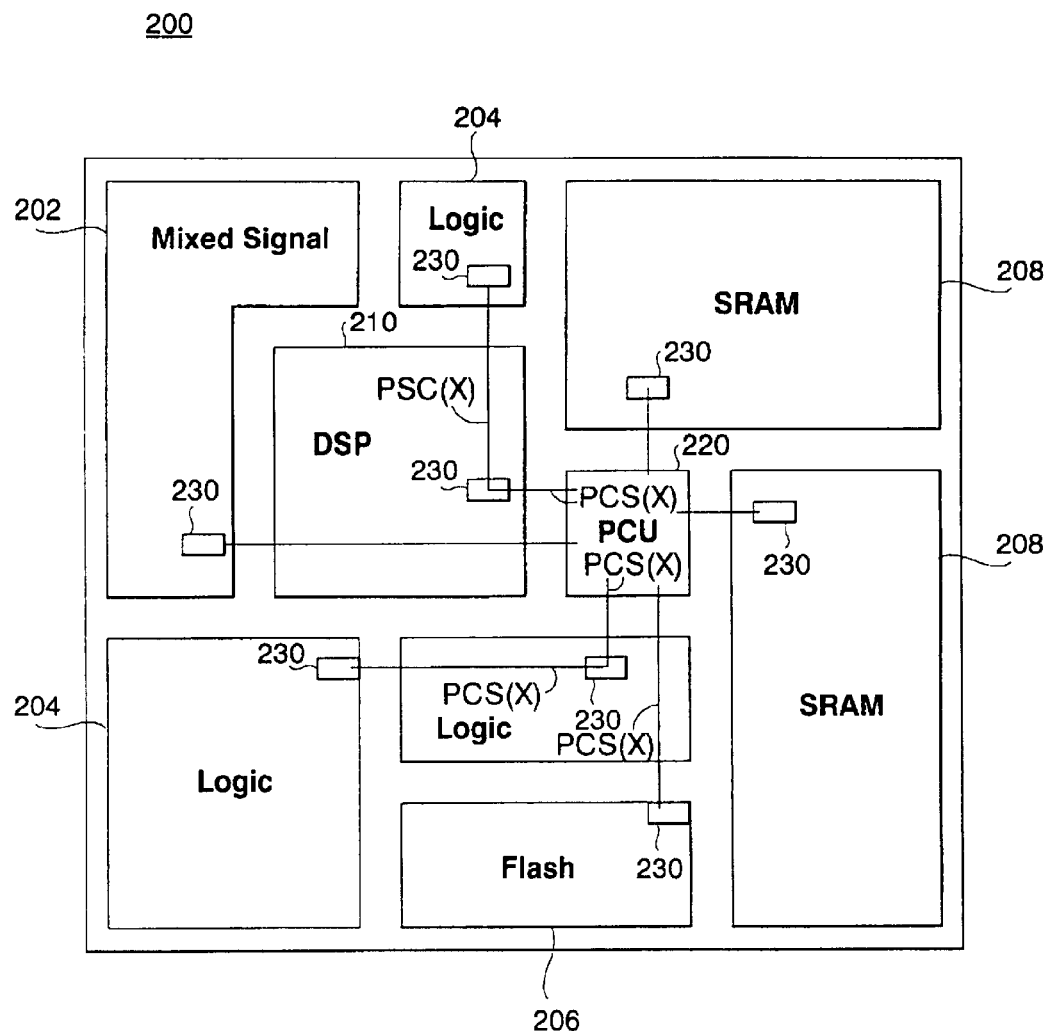
FIG. 2 a block diagram of a chip having a system on chip design in accordance with the present invention.

With reference to FIG. 2, an exemplary chip 200 having an SOC design (alternatively referred to as SOC chip or SOC) is shown. The SOC chip 200 includes a variety of units including a mixed signal unit 202, logic circuit units 204, a flash memory unit 206, SRAM units 208, a data signal processor (DSP) unit 210 and a power control unit (PCU) 220. Each of the units, other than the power control unit, which receives power from the chip supply voltage, is individually provided with power and/or voltage from an associated local DC voltage generator 230. There is no power connection between the units of the SOC chip 200.

Each of the local DC voltage generators 230 is controlled through the PCU 220. The PCU 220 generates power control signals (PCS(x), where x=1–n for n units) for controlling the local DC voltage generator 230 in accordance with power saving mode instructions received from an external source, in accordance with a determination of performance mode made by a source within the SOC chip 200, or in accordance with a determination made by the PCU 220 or a combination thereof. The determination of a performance mode is in accordance with detected power need, such as detection of a chip activity level including switching level, input/output (I/O) level and processing level. The PCU 220 determines whether the SOC chip 200 is operating in a high performance mode or in a low performance mode and decides which of the local DC voltage generators can be disabled. For example, if the PCU 220 determines that the SOC chip 200 is operating in the low performance mode, the PCU 220 generates a "low" PCS(x) to selected units or all of the units. If the PCU 220 determines that the SOC chip 200 is operating the high performance mode, the PCU 220 generates a "high" PCS(x) to all or some of the units. Thus, the amount of power provided to the units of the SOC chip 200 varies in accordance with the performance level of the SOC chip 200.

In another embodiment, the PCU 220 is capable of recognizing N (where N>=2) performance modes in which the SOC chip 200 is capable of operating, and generates the PCS(x) to each local DC voltage generator 230 in accordance with the recognized performance mode. The combination of PCS(1–n) generated to all of the DC voltage generators varies in accordance with the performance mode recognized by the PCU 220. Thus, the amount of power provided to the units of the SOC chip 200 varies in up to N levels in accordance with the performance level of the SOC chip.

Figure 3:
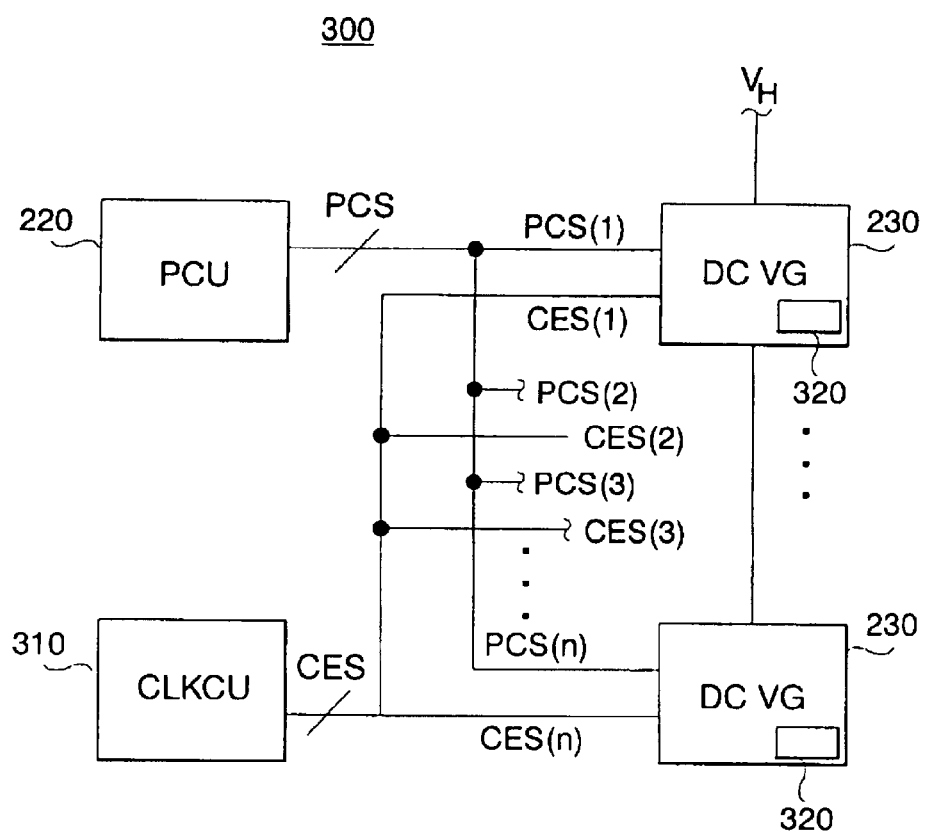
FIG. 3 is a block diagram of a SOC DC voltage generator system in accordance with the present invention.

With reference to FIG. 3, a distributed DC voltage generator system 300 for providing voltage and/or power to the units of the SOC chip 200 is shown. The distributed DC voltage generator system 300 includes a plurality of local DC voltage generators 230, the PCU 220 and a clock control unit (CLKCU) 310. The CLKCU 310 may be an external clock control unit or a clock control macro located on the SOC chip 200, which receives and processes an external clock signal, or generates and processes a clock signal. The CLKCU 310 generates a combined clock enable signal (CES) which is divided into individual signals CES(x), where x=1–n, corresponding to n DC voltage generators 230. Furthermore, each CES(x) signal is preferably provided to the unit associated with the DC voltage generator 230 receiving the CES(x) signal. The PCU 220 and the CLKCU 310 generate individual signals PCS(x) and CES(x) to each of the local DC voltage generators 230 for independently controlling the DC voltage generators 230. Each CES(x) and PCS(x) controls the on/off switch of the DC voltage generators 230 receiving the signal.

It is contemplated that control signals PCS(x) and CES(x), alone or in combination, may control different modes of operation of the local DC voltage generator 230 receiving the control signals CES(x) and/or PCS(x).

In order to provide the proper voltage level(s) to each unit, each local DC voltage generator 230 preferably includes a voltage pump system 320 for generating one or more operating voltages. The voltage pump system provides the ability to provide a higher operating voltage level to a unit such as the mixed signal unit 202, and different operating voltage levels (e.g., Vbb, Vneg and Vpp) for within a unit such as a unit having an embedded DRAM macro.

It is contemplated that a local DC voltage generator 230 may provide voltage and/or power voltage level to one or more units. The local DC voltage generator may include a pump system for providing one or more voltage levels.

Figure 4:
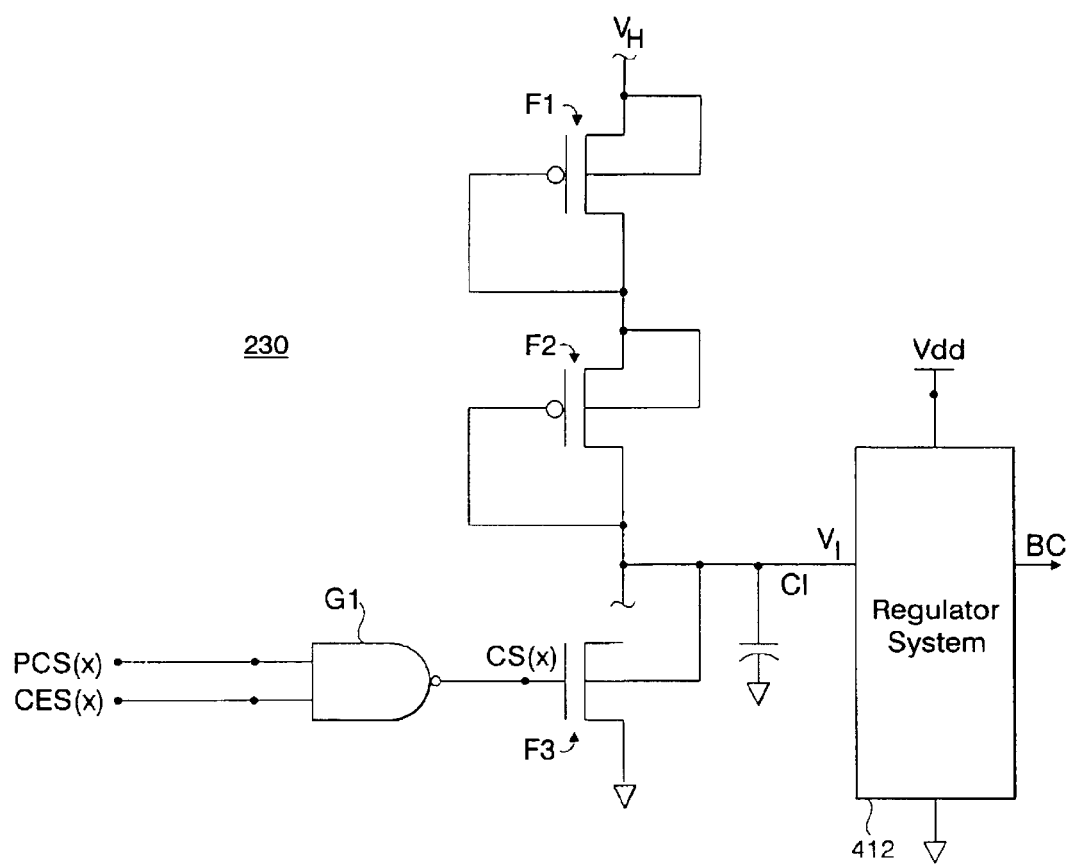
FIG. 4 is a circuit diagram of a local DC voltage generator in accordance with the present invention.

FIG. 4 shows an exemplary local DC voltage generator 230 including AND gate G1, FET devices F1–3, Capacitor C1 and regulator system 412. PCS(x) and CES(x) are received by G1 which outputs control signal CS(x) for controlling FET F3, preferably an nFET, which switches the regulator system 412 on or off. When either of PCS(x) and CES(x) are "low", CS(x) switches FET F3 "off" so that no DC current flows to the regulator system 412. When both PCS(x) and CES(x) are "high", CS(x) switches FET F3 "on" and power supply voltage $V_H$ is provided to the regulator system 412. FET devices F1, F2, which are preferably pFET devices, are cascade transistors functioning as a voltage divider, where the amount of voltage passing through the FET devices F1, F2 is determined by the size of the FET devices F1, F2 (in a way similar to relatively bulky resistors). Preferably, the FET devices F1 and F2 are different sizes. Capacitor C1 is a decoupling capacitor for reducing power supply noise due to wiring inductance along a supply line connecting the power supply to the regulator system 412. Wiring inductance is further minimized by maintaining the supply line to be short.

Figure 1:
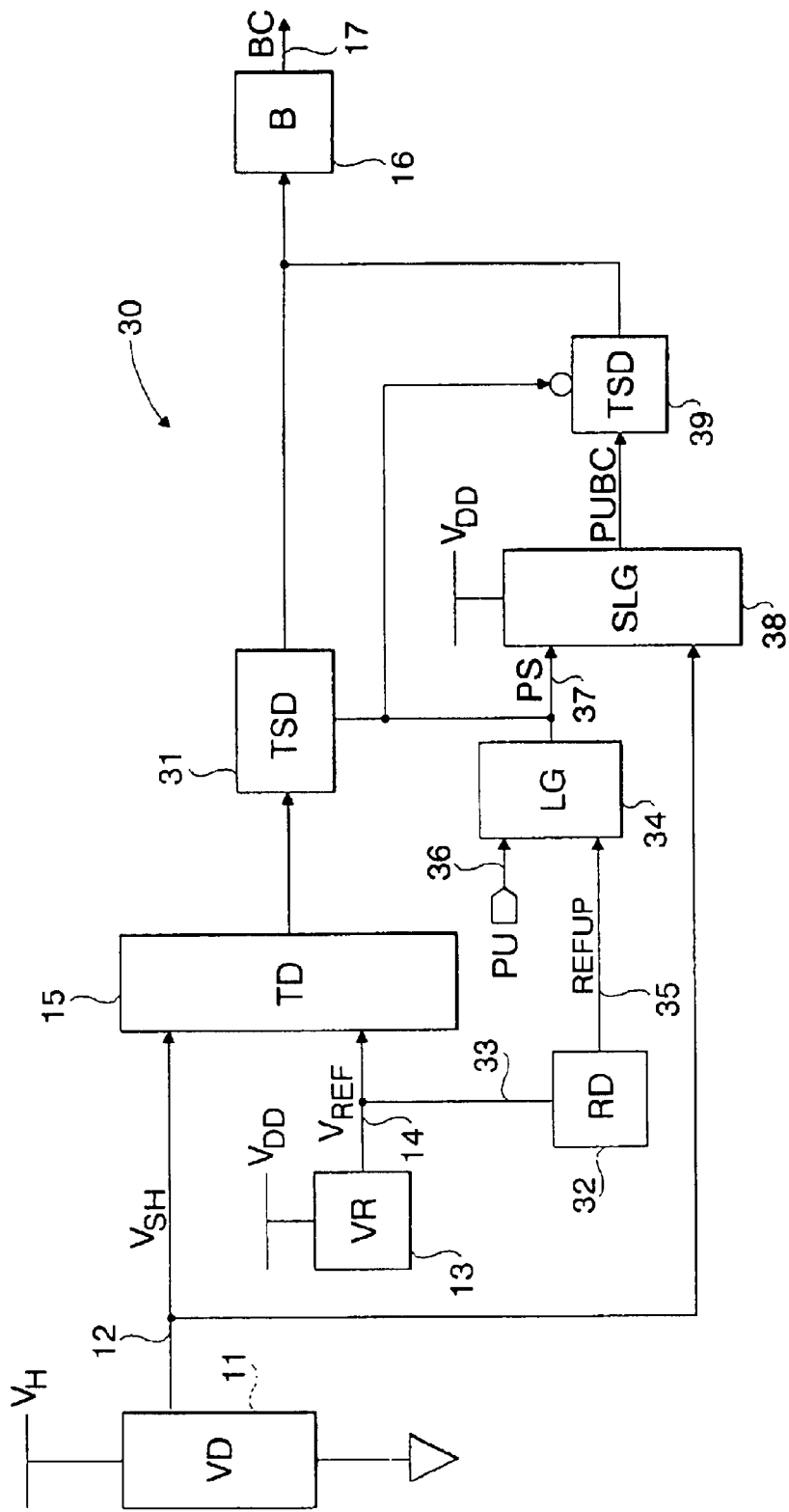
FIG. 1 is a block diagram of a prior art DC voltage generator system.

The regulator system 412 may be a conventional regulator system such as the prior art regulator system 30 shown in FIG. 1. The regulator system 412 of the local DC voltage generator 230 associated with each unit may be customized to provide the proper voltage level required by that unit. A voltage $V_I$ indicative of the power supply voltage $V_H$ is provided to a voltage divider (not shown, similar to VD 11 of FIG. 1) of the regulator system, and is compared to a reference voltage for determining the value of the output control signal BC which controls a charge pump (not shown) for outputting the proper voltage level to the unit. The voltage level output to the unit is selectable by selecting the reference voltage. Thus, the voltage level output by each local DC voltage generator 230 is selectable by selecting the reference voltage for the regulator system 412 of the local DC voltage generator 230. As mentioned above, the charge pump may be a charge pump system capable of providing different operating voltage levels to one unit, such as Vbb, Vneg and Vpp.

When either the PCS(x) and CES(x) signal are "low" and CS(x) is "low", current does not flow to the voltage divider of the regulator system 412 and thus to the regulator system 412, and therefore current flow in the local Dc voltage generator 230.

The distributed DC voltage generator system 200 provides further advantages including power supply noise reduction due to locally supplied power, where the power may be supplied from the nearest supply pins. In addition, noise cross-contamination between neighboring units is virtually eliminated as there is no power connection between the units due to independent connections between the units and the power source.

What has been described herein is merely illustrative of the application of the principles of the present invention. For example, the systems described above and implemented as the best mode for operating the present invention are for illustration purposes only. For instance, other design configurations may be used which provide similar operation as the system described herein. In other words, other arrangements and methods may be implemented by those skilled in the art and are contemplated to be within the scope of the appended claims.

What is the claimed is:

1. A direct current (DC) voltage generator system for supplying at least one voltage to a plurality of units on a chip, the chip having a system on chip (SOC) design, the DC voltage generator system comprising:

a plurality of local DC voltage generators distributed throughout the chip;

a power control unit for generating at least one power control signal for controlling each local DC voltage generator; and a clock control unit for generating at least one clock control signal for controlling each local DC voltage generator, wherein each of the local DC voltage generators includes
a section for receiving one of the at least one power control signal and clock control signal and for outputting a reference voltage based on the received control signals,
a regulator system for receiving the reference voltage and for outputting a pump control signal based on the reference voltage, and
a pump system for receiving the pump control signal, for generating at least one voltage based on the pump control signal, and for outputting the at least one voltage to at least one unit.

* * * * *